March 23, 1954     D. E. LUPFER ET AL     2,672,751
AUTOMATIC TIME-TEMPERATURE CURVE APPARATUS
Filed Sept. 24, 1951     2 Sheets-Sheet 1

INVENTORS.
D. E. LUPFER
E. E. KLEINMANN
W. R. EDDY
BY Hudson + Young
ATTORNEYS

March 23, 1954

D. E. LUPFER ET AL 2,672,751

AUTOMATIC TIME-TEMPERATURE CURVE APPARATUS

Filed Sept. 24, 1951

INVENTORS
D. E. LUPFER
E. E. KLEINMANN
W. R. EDDY

BY

Hudson & Young

ATTORNEYS

Patented Mar. 23, 1954

2,672,751

UNITED STATES PATENT OFFICE 2,672,751

AUTOMATIC TIME-TEMPERATURE CURVE APPARATUS

Dale E. Lupfer, Earl E. Kleinmann, and William R. Eddy, Bartlesville, Okla., assignors to Phillips Petroleum Company, a corporation of Delaware Application September 24, 1951, Serial No. 248,066

5 Claims. (Cl. 73—17)

This invention relates to apparatus for automatically determining the time-temperature curve of a solution. In one of its aspects it relates to apparatus for automatically determining the cooling curve of a solution. In a preferred embodiment it relates to apparatus for continuously and automatically determining the fudge point of a concentrated aqueous solution of ammonium nitrate.

In the operation of many processes it is often times desirable to control those processes with respect to some variable which is readily determinable from a particular characteristic in a time-temperature curve of one of the solutions present. One instance of this can be found in the operation of a prilling tower in a process for the production of prilled ammonium nitrate fertilizer. In operating a prilling tower it is essential that close control be maintained over the concentration of the solution of ammonium nitrate being fed to the sprayers at the top of the tower. One method for quickly determining the concentration of the solution is to determine its fudge or mush point. By "fudge point" as used herein we mean that temperature when cooling a concentrated aqueous solution of ammonium nitrate at which the nuclei of ammonium nitrate crystals just begin to form, and by "mush point" as used herein we mean that temperature at which the mixture of crystallized ammonium nitrate and solution becomes mushy. In the concentration range of 95.6 to 98 per cent by weight of ammonium nitrate, the fudge point is the temperature at the first break or change in slope in the time-temperature cooling curve of the solution and the mush point is the temperature at the second break in the cooling curve. At concentrations below 95.5 per cent the fudge and mush points occur at the same point in the cooling curve. It should be stated, however, that the terms "fudge point" and "mush point" have no generally accepted meaning in the art and their connotations may vary. The fudge and mush points of a concentrated aqueous solution of ammonium nitrate are in a general way proportional to the concentration of the solution, i. e., as the concentration of the solution increases the fudge and mush points increase. The fudge point does not vary at the same rate as the mush point with changes in the concentration of the solution. The fudge point or mush point temperatures of a solution of ammonium nitrate of desired concentration can readily be determined by one skilled in the art. If the fudge point or mush point temperatures are above the predetermined values corresponding to the desired concentration, indicating too high a concentration, the evaporator may be controlled to alleviate the problem. One method of controlling the concentration of an ammonium nitrate solution is disclosed in the copending application of Russell K. Simms, filed August 20, 1951, Serial No. 242,765. Another method for controlling the concentration of an ammonium nitrate solution is to vary the heat input to the evaporator concentrating the solution.

It is an object of this invention to provide apparatus for automatically determining the time-temperature curve of a solution.

It is a further object of this invention to provide apparatus for automatically determining the cooling curve of a solution.

Still another object of the invention is to provide apparatus for continuously and automatically determining the fudge point of a concentrated aqueous solution of ammonium nitrate.

Other objects and advantages of this invention will be apparent to one skilled in the art from the accompanying disclosure and discussion.

The apparatus of our invention can be fabricated of many parts and from a considerable varied group of corrosion resistant materials. For example, the sample container can be constructed of stainless steels or aluminum.

This invention broadly makes use of a conduit attached to the inlet of a sample container into which a sample is withdrawn, means for constantly agitating the sample therein, means for adjusting the temperature of the sample in the container, a pump for drawing a fresh sample and discharging an old sample therefrom, a short conduit connected between outlet and the inlet of the pump, a temperature sensing element to detect changes in temperature of the sample, a temperature recorder controller connected to said temperature sensing element to record said changes in temperature, and a cycle timer actuated by said temperature recorder controller when a predetermined temperature is recorded to automatically operate the pump to discharge the old sample from the sample container and draw a fresh sample therein and to operate the means for temperature adjustment. While a fresh sample is in the sample container its temperature is constantly adjusted by the means provided therefor and a time-temperature curve is constantly recorded. Thus this apparatus makes possible a continuous and automatic sampling and analysis of a liquid solution.

Figure 1:
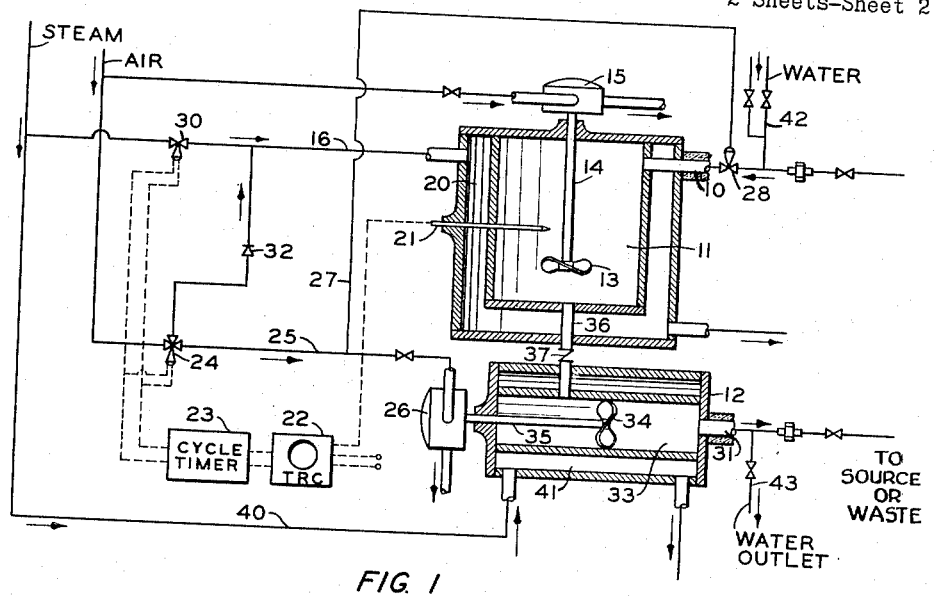
Figure 1 is a diagrammatic view partly in vertical cross-section of apparatus which illustrates a preferred embodiment of our invention.

Referring now to Figure 1 in detail, a sample of highly concentrated aqueous solution of ammonium nitrate at a temperature of approximately 140° C. is drawn into sample container 11 through motor valve 28 in conduit 10 by means of pump 12, conduit 10 being attached to a source of said solution. Conduit 10 should be as short as possible or sufficiently insulated or otherwise constructed to prevent a "freezing" of the ammonium nitrate solution therein. The fresh sample present in container 11 is agitated by at least one impeller 13 which is positioned more than half way down into said container 11 and mounted on shaft 14, said shaft 14 being coaxially disposed and extending upward through the top of container 11 and rotated by coaxially mounted air-driven motor 15. The fresh sample in container 11 is cooled by air from line 16 being circulated through jacket 20. As the solution cools the changes in temperature are detected by means of an extremely sensitive thermalelectric probe 21 mounted in said sample container perpendicularly to the axis of said sample container and midway between the top and the bottom thereof. Probe 21 is connected to temperature recorder controller 22. A preferred specific probe containing a thermistor and a preferred temperature recorder, individually and in combination, are disclosed and claimed in the copending application of J. W. Hutchins, filed September 24, 1951, Serial No. 248,048. As the temperature changes are recorded on the chart of temperature recorder controller 22 characteristics (fudge and mush points) appear in the cooling curve which indicate the concentration of the sample. When a predetermined lower temperature, usually between 120 and 125° C., is recorded, the temperature recorder-controller 22 actuates cycle timer 23 which may be one of many conventional devices of its type on the market. An illustration of cycle timer 23 and its connections is given in Figure 3 of the drawings. Returning now to the cycle before mentioned, when the predetermined temperature is recorded and cycle timer 23 is actuated, three-way solenoid operated valve 24 opens one port to admit air through line 25 to air-driven pump motor 26 at the same time passing air through line 27 to diaphragm operated motor valve 28 opening said valve 28 thus withdrawing from sample container 11 the old sample therein through pump 12 and out conduit 31 and flushing the container with fresh solution, said old sample going either to waste or back to the original source of the solution. Another port of three-way solenoid operated valve 24 closes thus stopping the flow of air being circulated through jacket 20. When this occurs two-way solenoid operated valve 30 opens to admit steam through line 16 which circulates through jacket 20 thus melting any solid ammonium nitrate which may have crystallized on the inner wall of container 11. Check valve 32 is placed after valve 24 to prevent steam from backing up into the air line. Aforementioned pump 12 is horizontally disposed below the sample container 11 and is comprised of housing 33, rotor 34, shaft 35, air-driven pump motor 26 and steam jacket 41. Rotor 34 is positioned away from the inlet of pump 12 said shaft 35 said shaft extending co-mounted on shaft 35 said shaft extending coaxially through the end of housing 33 and rotated by coaxially mounted motor 26. The inlet of pump 12 extends through the cylindrical wall of the housing and jacket and is located near the end of the housing where the motor is mounted. The inlet of said pump housing is connected with the outlet of container 11 by means of a short conduit, said conduit having positioned therein ball check valve 37 which allows the solution to flow only through the pump and prevents hot liquid solution contained in the pump housing from being drawn into the sample container by the stirring action therein and thus interfere with the cooling of the sample. Steam from line 41 in 40 is constantly circulated through jacket 41 in order to insure the proper functioning of pump 12. That is, the solution container therein is kept hot so that ammonium nitrate will not freeze and prevent circulation of liquid when necessary. During the operation of pump 12 enough hot concentrated aqueous solution is circulated through container 11 and pump 12 to sufficiently insure a fresh sample in container 11 unhindered by caking of ammonium nitrate on the inside walls of container 11. Usually this takes about five minutes. Thus when a fresh sample is again in container 11 solenoid operated valve 30 automatically stops the flow of steam through line 16 and jacket 20 and solenoid operated valve 24 stops the flow of air to pump motor 26 and passes air through check valve 32 and line 16 into jacket 20 again cooling the fresh sample and resulting in a new determination of the fudge point. When the air to pump motor 26 is stopped motor valve 28 is closed, stopping the flow of fresh material, due to the pressure release upon the diaphragm through a bleed orifice usually contained in diaphragm type motor valves. The period of time necessary for the discharge of old sample from the sample container and a hot fresh sample drawn into same can be within the range of ½ to 10 minutes. A five minute period is preferred. This period may be varied by adjusting the cycle timer as hereinafter described. Stirrer motor 15 and pump motor 26 are air driven not only for convenience but also because they eliminate any danger of explosion of ammonium nitrate. Means are shown for water flushing the apparatus when such becomes necessary due to an excessive amount of caking of ammonium nitrate in the apparatus. Thus water may be passed through line 42, conduit 10, through container 11, pump 12, conduit 31 and out line 43. Although the apparatus is designed to allow only a minimum amount of said caking it would seem desirable to water flush periodically. Care should be taken after said water flushing operation to insure that a truly representative sample of ammonium nitrate solution is being cooled rather than a solution diluted by any water remaining in the apparatus. It should be noted that conduit 31 should also be short or well insulated or otherwise constructed to eliminate any "freezing" of ammonium nitrate in the line.

Figure 2:
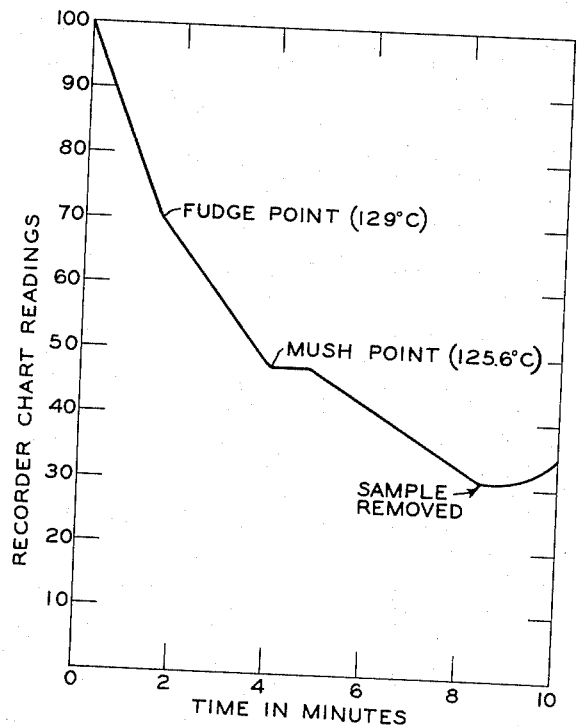
Figure 2 represents a typical cooling curve of a concentrated aqueous solution of ammonium nitrate as recorded on the chart of an electronic recorder used in the apparatus of our invention.

Referring now to Figure 2, illustrated is a typical cooling curve of a concentrated aqueous solution of ammonium nitrate as recorded upon the chart of temperature recorder controller 22. It will be appreciated that the drawing as shown is actually on its side with respect to how it would actually be viewed on the instrument. That is, as actually viewed, time would appear as an ordinate instead of as an abscissa as shown. It will also be appreciated that the recorder chart readings as such must be calibrated in terms of temperature since the ordinary chart paper used in a temperature recorder is not necessarily calibrated to the system in which the apparatus is being employed. As noted the fudge point occurred at a temperature of 129° C. and the mush point occurred at 125.6° C. The sample was removed at approximately 122° C. In actual operation of the apparatus of this invention it is often possible to hear the stirring device slow down when the first break in the curve occurs due to an increase in the viscosity of the solution. When the second break occurs the stirring device is almost stopped.

Figure 3:
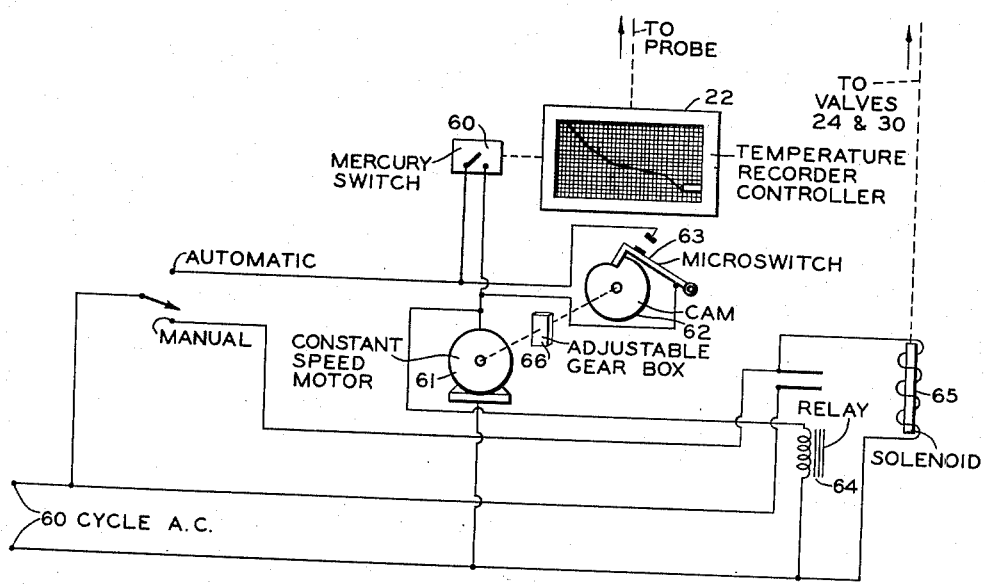
Figure 3 illustrates the connection and operation of a preferred cycle timer which may be used in the apparatus of our invention.

Referring to Figure 3 in detail, when a temperature in the range of 120 to 125° C. is recorded on temperature recorder controller 22, mercury switch 60, usually placed in the recorder itself, is tripped and closed and constant speed motor 61 operates to turn cam 62. At the same time the circuit is closed through relay 64 and solenoid 65 is actuated. As cam 62 turns microswitch 63 is closed concomitantly connecting a secondary circuit to motor 61 and relay 64. Solenoid 65 operates valves 24 and 30 as hereinbefore described. The period which microswitch 63 will remain closed can be varied by adjusting gear box 66 to increase or decrease the speed of rotation of cam 62. The usual period which microswitch 63 remains closed is five minutes. As steam is circulated through the jacket of the sample container mercury switch 60 is opened due to the higher temperature which is recorded. However, the circuit is kept closed by means of microswitch 63 until a complete revolution of cam 62 is made and said microswitch opens and valves 24 and 30 revert to their former position. Means are shown for operating the cycle timer either manually or automatically. Of course, during the automatic operation of the entire apparatus, the cycle timer is operated automatically as hereinbefore described.

This invention has been described and exemplified in terms of its preferred embodiments. However, one skilled in the art will readily appreciate that modifications may be made without departing from the spirit and scope of this invention.

We claim:

1. Apparatus for continuously and automatically determining the fudge point of a concentrated aqueous solution of ammonium nitrate which comprises, in combination, a vertically disposed closed jacketed cylindrical sample container having an inlet near the top and an outlet through the base, a conduit for drawing a sample of the solution connected to said inlet, a stirring device comprised of at least one impeller positioned more than half way down into said sample container and mounted on a shaft coaxially disposed and extending upward through the top of the sample container, a coaxially mounted air-driven motor driving said shaft, a horizontally disposed steam-jacketed cyclindrical pump housing, the inlet of which extends through the cyclinder wall near one end and the outlet of which extends through the other end, a short straight conduit connected between the outlet of said sample container and inlet of said pump housing, a ball check valve in said conduit to allow flow only away from the sample container, a rotor in said pump housing and attached to a coaxiallly disposed shaft which extends through the center of the end near the inlet of the housing, a coaxially mounted air-driven motor rotating said last mentioned shaft, a conduit connected to the outlet of the pump housing through which the old sample is discharged, a thermal-electric probe mounted in and perpendicular to the axis of said sample container and mid way between the top and bottom thereof to detect changes in the temperature of the sample, a temperature recorder controller connected with said probe to record said changes in temperature, a solenoid operated valve connected to admit steam to the jacket of the sample container, a three-way solenoid operated valve connected to admit air to the jacket of the sample container and connected to pass air through the air-driven pump motor, an air-operated motor valve positioned in said first-mentioned conduit and controlled to be open when said pump motor is operating and closed when said pump motor is not operating, and a cycle timer, actuated by said temperature recorder controller when a predetermined lower temperature is recorded to automatically operate said last mentioned solenoid operated valve to stop the flow of air to the jacket of said sample container and to pass air through said pump motor concomitantly opening said air-operated motor valve thus discharging the old sample and drawing a fresh sample, and to operate said first mentioned solenoid operated valve to admit steam to the jacket of said sample container, said operation taking place for five minutes, at the end of which time the first mentioned solenoid operated valve closes stopping the flow of steam to the jacket of said sample container and said last mentioned solenoid operated valve stops the flow of air to the pump motor concomitantly closing said air-operated motor valve and admits air to the jacket of said sample container, thus starting another determination of the fudge point.

2. Apparatus for automatically determining the fudge point of a concentrated aqueous ammonium nitrate solution which comprises, in combination, a closed jacketed sample container, a conduit for drawing a sample of the solution connected to the inlet of said sample container, a stirring device for constantly agitating the sample, a pump contained in a steam jacketed housing the inlet of said pump being connected to the outlet of said sample container and the outlet of said pump being connected with a conduit through which old sample is discharged, a check valve positioned in said conduit to allow flow only away from the sample container, a thermal-electric sensing element mounted in said sample container to detect changes in the temperature of the sample, a temperature recorder controller connected with said thermal-electric sensing element to record said changes in temperature, means for circulating steam through the jacket of said sample container, means for circulating air through the jacket of said sample container, and a cycle timer actuated by said temperature recorder controller when a predetermined lower temperature is recorded to automatically stop the circulation of air through the jacket of said sample container, to automatically operate the means for circulating steam through the jacket of said container and to automatically cause said pump to operate thus discharging the old sample from said container and drawing a fresh hot sample into same, said operation lasting for ½ to 10 minutes and at the end of said period said cycle timer automatically causing the operation of said pump to cease, the circulation of steam through said jacket to cease and the recirculation of air through said jacket to occur, thus starting another determination of the fudge point.

3. Apparatus for automatically determining the cooling curve of an aqueous solution which comprises, in combination, a closed jacketed sample container, a conduit for drawing the sample of the solution connected to the inlet of said sample container, means for constantly agitating the sample therein, a pump for drawing a fresh sample into the sample container and discharging the old sample therefrom, a conduit connected to the outlet of the pump through which the old sample is discharged, a thermal-electric sensing element to detect changes in the temperature of the solution, a temperature recorder controller connected with said thermal-electric sensing element to record said changes in temperature, means for circulating a heating fluid through the jacket of said sample container, means for circulating a cooling fluid through the jacket of said sample container, and a cycle timer actuated by said temperature recorder controller when a predetermined lower temperature is recorded to automatically stop the circulation of cooling fluid through the jacket of said sample container, to automatically operate the means for circulating heating fluid through the jacket of said container and to automatically cause said pump to operate thus discharging the old sample from said container and drawing a fresh hot sample into same, said operation lasting for a period sufficiently long to insure a representative sample, and at the end of said period said cycle timer automatically causing the operation of said pump to cease, the circulation of heating fluid through said jacket to cease and the recirculation of cooling fluid through said jacket to occur, thus starting another determination of the cooling curve.

4. Apparatus for automatically determining the cooling curve of a solution which comprises, in combination, a closed sample container, a conduit for withdrawing a sample of the solution connected to the inlet of said sample container and to a source of solution, means for constantly agitating the sample therein, a pump for drawing a fresh sample into the sample container and discharging the old sample therefrom, a conduit connected to the outlet of the pump through which the old sample is discharged, a thermal-electric sensing element to detect changes in the temperature of the solution, a temperature recorder controller connected with said thermal-electric sensing element to record said changes in temperature, means for heating the sample in said sample container, means for cooling the sample in said sample container, and a cycle timer, actuated by said temperature recorder controller when a predetermined lower temperature is recorded to automatically stop the cooling of said sample, to automatically heat said sample and to automatically cause said pump to operate thus discharging the old sample from said sample container and drawing a fresh sample into same, said operation lasting for a period sufficiently long to insure a representative sample, and at the end of said period said cycle timer automatically causing the operation of said pump to cease, the heating of the sample to cease and the cooling of the fresh sample to occur, thus starting another determination of the cooling curve.

5. Apparatus for automatically determining the time-temperature curve of a solution which comprises, in combination, a sample container, a conduit for withdrawing a sample of the solution connected to the inlet of said sample container, means for constantly agitating the sample therein, means for adjusting the temperature of the sample therein, a pump for drawing a fresh sample into the sample container and discharging the old sample therefrom, a thermal-electric sensing element to detect changes in the temperature of the solution in said sample container, a temperature recorder controller connected with said thermal-electric sensing element to record said changes in temperature, and a cycle timer, actuated by said temperature recorder controller when a predetermined temperature is recorded, to automatically operate the pump to discharge the old sample from the sample container and draw a fresh sample therein, said operation lasting for a period sufficiently long to insure a representative sample, and at the end of said period said cycle timer automatically causing the operation of the pump to cease and to automatically cause said temperature adjustment means to operate, thus starting another determination of the time-temperature curve.

DALE E. LUPFER.
EARL E. KLEINMANN.
WILLIAM R. EDDY.

References Cited in the file of this patent

UNITED STATES PATENTS

| Number | Name | Date |
| --- | --- | --- |
| 1,131,361 | Gallup | Mar. 9, 1915 |
| 1,999,026 | Tramm et al. | Apr. 23, 1935 |
| 2,121,208 | Mulligan | June 21, 1938 |
| 2,571,651 | Balduzzi | Oct. 16, 1951 |

OTHER REFERENCES

Chemical Society Journal (London), vol. 115 (1919); pages 1387–1396.